May 24, 1932.  R. M. THOMAS  1,860,302
BABY'S THERMOCHEST
Filed Jan. 8, 1931   2 Sheets-Sheet 1
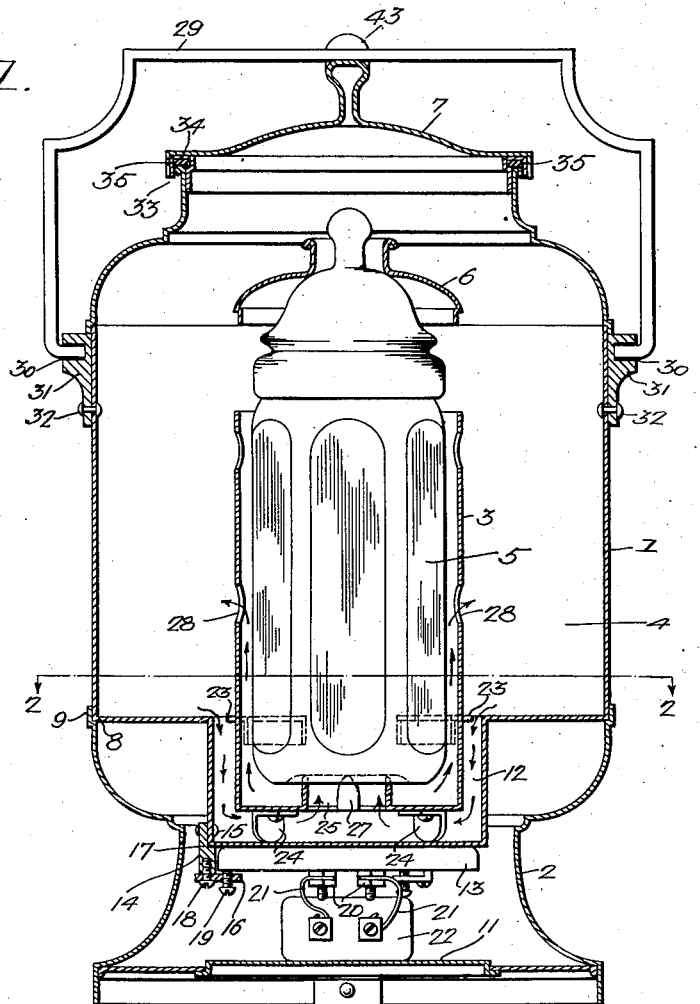
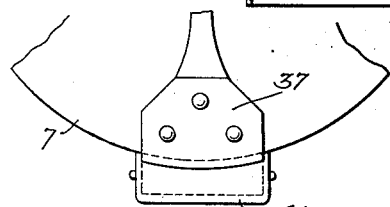
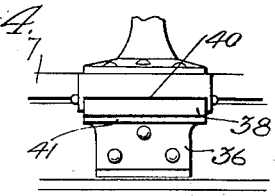
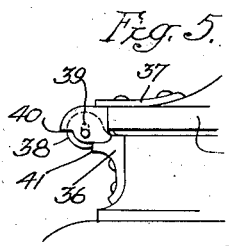
Inventor:-
Raymond M. Thomas
by his Attorneys
Howson & Howson May 24, 1932.  R. M. THOMAS  1,860,302
BABY'S THERMOCHEST
Filed Jan. 8, 1931    2 Sheets-Sheet 2

Inventor:
Raymond M. Thomas
by his Attorneys
Howson & Howson

Patented May 24, 1932

1,860,302

UNITED STATES PATENT OFFICE

RAYMOND M. THOMAS, OF WAYNE, PENNSYLVANIA

BABY'S THERMOCHEST

Application filed January 8, 1931. Serial No. 507,463.

This invention relates to devices particularly adapted to keep a baby's bottle or similar vessel cool and sweet until such time as it is desired to heat it, and then to heat such vessel and its contents.

The device comprises essentially a chamber surrounding the bottle or vessel adapted to receive a suitable solidified refrigerant, such as ice cubes or cracked ice, and an electrical heating element adapted to heat the liquid which ultimately surrounds the vessel as the refrigerant melts. The device primarily lends itself to use in the bedroom in preference to going downstairs in the middle of the night to the refrigerator for the baby's bottle. The vessel may be placed in an easily accessible position, and may be connected to a suitable electric outlet so that the current-controlling switch may be turned on whenever desired. The device may be so constructed that it can be easily carried about and may, therefore, be taken on automobile trips or when visiting one's friends. When the weather is such that the bottle can be kept in the bedroom at night without ice, the device still has its value as a heater. Thus it is obvious that such a device meets an urgent need and serves useful purposes on various occasions.

The principal object of the invention is, therefore, to provide a device of the nature indicated which will be simple in construction and which will, therefore, readily lend itself to commercial manufacture.

Other objects and features of the invention will be apparent hereinafter.

In the drawings:

Fig. 1 is a sectional view in elevation of a device constructed in accordance with the invention;

Figs. 3 to 5 are detail views of the novel hinge construction employed in the device.

Figure 6:
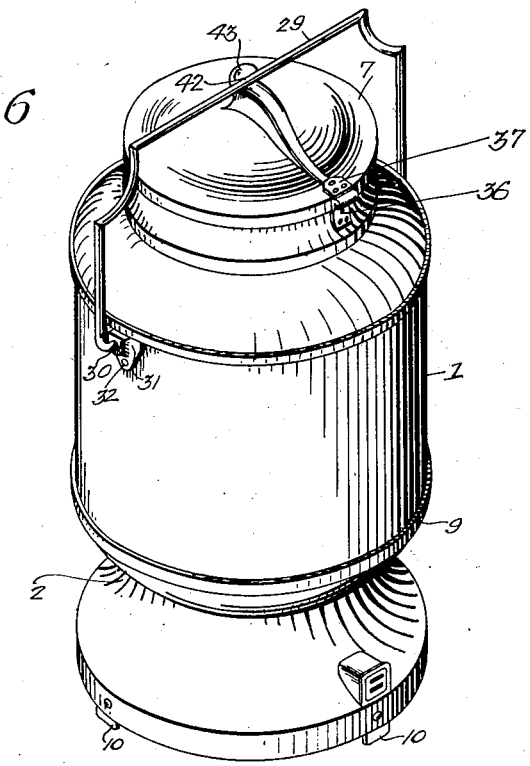
Fig. 6 is a perspective view of the device.
Figure 2:
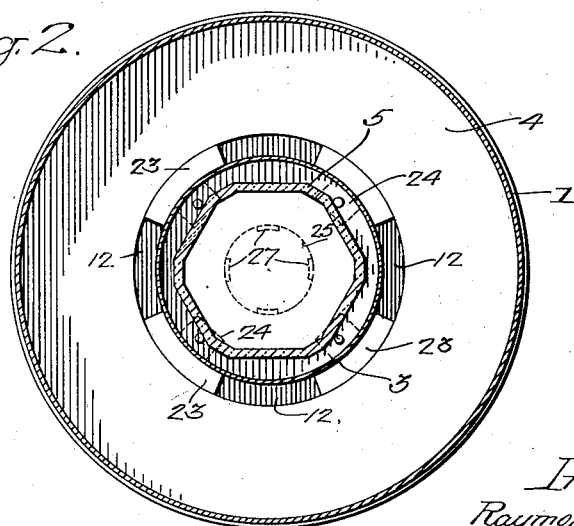
Fig. 2 is a sectional view along line 2—2 of Fig. 1.

Referring to the drawings, and particularly to Fig. 1, the device comprises an outer container 1 adapted to be supported by a base 2 and adapted to surround an inner container 3. The inner container may be permanently attached to the device within the outer container, or it may be removable with respect to the outer container. In the present instance, I have disclosed the inner container as removable, since I prefer to have it so rather than permanently secured. The outer container is of such size with respect to the inner container that a suitable space 4 is provided for the reception of a suitable solidified refrigerant, preferably ice cubes or cracked ice. The inner container is adapted to removably receive a baby's bottle 5, or a similar vessel. While I prefer to have both the inner and outer containers cylindrical in shape, it will be readily apparent that the size and shape of these members of the device may be varied at will. Likewise, the material from which the constituent parts of the device are made may be such as meets the desire of the particular maker or manufacturer. I prefer, however, to make the device either nickel or chromium plated.

Inner container 3 may be provided with a suitable tight-fitting lid or cover 6 (shown in raised position in Fig. 1) suitably shaped and provided with a centrally disposed opening in the top thereof to accommodate the nipple of the baby's bottle. Outer container 1 may be provided with a suitable hinged lid 7, the details of which will be described fully hereinafter. As shown clearly in Fig. 1, the outer container constitutes the main body portion of the device and carries the various elements thereof. Base 2 may be formed to provide an annular ledge 8 upon which the lower peripheral rim of container 1 is adapted to seat. The wall of the container may be firmly attached to the upstanding portion 9 of base 2 in any suitable manner. If desired, the container may be permanently attached to the base in any conventional manner of sealing lap joints, or, alternately, the container may be made removable with respect to the base by merely providing removable screws or the like about the peripheral overlapping portions of the members. Base 2 may be provided with suitable feet 10, and may also be provided on the underside thereof with a removable closure member or cover 11. The purpose of having such a removable cover in the underside of the base is to permit access to the electrical heating element housed by the base, as will be more apparent hereinafter.

The lower portion of container 1 is formed to provide a suitable centrally disposed recess 12 in which container 3 is adapted to be mounted. The base of the recess may carry a suitable electric heating element 13. This element may, of course, be of suitable capacity in any particular instance, and may take the usual form of such elements. It may be removably carried by the base of container 1 by means of a plurality of lugs 14 spaced thereabout. The lugs may be permanently attached to the vertical walls of the recessed portion of container 1 by means of suitable rivets 15 or the like. The lugs are preferably composed of two parts, the horizontal part being removably fastened to the vertical part 17 by means of suitable screws 18 or the like. It will be apparent that the horizontal members of the lugs may be swung about screws 18 as pivots to provide removable mounting of the heating element 13. The vertical position of the heating element with respect to the supporting horizontal portions of the lugs may be adjusted by suitable set screws 19. The heating element will, of course, be provided with suitable terminals 20, which may be connected by means of conductors 21 within the base to a plug receptacle 22 mounted in the wall of the base. Obviously, it will be only necessary to insert the prongs of a co-acting plug connected to a suitable current source into the receptacle to connect the device to such source.

The inner container 3 is of smaller diameter than recess 12 in container 1, so that a narrow jacket space is provided about container 3 between the outside circular wall thereof and the inner wall of the recess. For the purpose of the invention, it is desired that container 3 at all times be maintained centrally disposed in the recess, and to this end a plurality of spacers 23 may be provided about container 3 and permanently attached thereto by suitable rivets or the like. These spacers may take the form of pieces of metal bent to provide a vertical attaching portion and a horizontal extending spacing portion. It is also essential in accordance with the invention that a space be maintained beneath container 3, and to this end the container is provided with suitable feet 24 which are adapted to rest on the base of the recess. The purpose of the space about container 3 is to permit circulation of the liquid resulting from the melting of the solidified refrigerant in container 1. The base of container 3 may be formed to provide a central aperture 25 and vertical tabs 26. This may be accomplished by stamping the base to remove the desired portions thereof and then bending the tabs upward. The bottle 5 is adapted to rest upon the tabs. The space between the tabs will permit liquid flowing in the direction of the arrows (see Fig. 1) to enter container 3 around bottle 5. It will be noted that by means of the arrangement shown and described, a suitable circulating space is provided between the bottle and container 3 for the liquid. The cylindrical wall of container 3 is provided with a plurality of spaced openings 28 to permit the flow of the liquid back into container 1 and also to allow circulation of air between the two containers in the upper part of the device. The uppermost of the openings 28 will, of course, be above the liquid level and will permit the desired circulation of cool air between the containers, while the lower holes below the surface of the liquid will permit the desired circulation of the liquid as the refrigerant melts.

A handle 29 may be provided for the device and may be suitably arranged to also act as a resilient latching device for the lid or cover 7 of container 1. This handle may take the form of a metallic rod bent in the form clearly illustrated and having its ends turned inwardly to engage recesses 30 in ears 31 provided at diagrammatically opposite points on the outer surface of container 1. These ears may be permanently attached to the wall of the container by means of suitable rivets 32 or the like. Container 1 may be formed in two parts, the upper part being permanently or removably attached to the lower part by means of a suitable lap joint similar to that used in connection with base 2 and previously explained. The upper rim of the upper part may be bent outward to provide a suitable seating bead 33 for lid 7. The lid may be formed to provide an annular recess 34 about the rim thereof, and such recess may carry a suitable resilient washer 35 adapted to press against bead 33. The washer may be composed of rubber or other suitable resilient material. Lid 7 may be hinged to container 1 by means of a self adjusting hinge arrangement shown in detail in Figs. 3 to 5. As shown in these figures, the hinge may comprise a stationary member 36 suitably riveted or otherwise attached to the wall of container 1 and a movable member 37 fastened similarly to the lid. Member 36 may be formed to provide a cylindrical hinge-seating portion 38 having a rectangular opening 39 extending longitudinally therethrough. Member 37 may be formed to provide a co-acting portion having apertured side walls for the reception of a round pin adapted to extend through the rectangular opening 39. By means of such construction, it will be apparent that the pin may ride in its rectangular seat to provide self adjustment of the lid with respect to the container. The edge 40 of the movable hinge element will abut against surface 41 of the stationary element to limit the motion of the lid.

The upper central portion of cover 7 is preferably formed to provide a notch 42 and a stop 43 (see Fig. 6). The resilient character of handle 29 enables the forcing of the central portion thereof into notch 42 to securely clamp the lid of the device in place. Stop 43, however, prevents passage of the handle to the opposite side of the device. It will be apparent that the handle is always on the same side of the device and, as a result, it may easily be found at night when desired. The vertical movement of the hinge permits evenly distributed pressure about the washer carried by the lid and the rim of container 1.

The device is preferably designed to accommodate ice cubes of any size up to one and one-half inches, which is the largest in common use, or broken natural ice provided around the bottle container. The cap of the bottle container prevents accidental filling of such container with ice. This container may be designed to accommodate variously proportioned eight ounce bottles which have proved to be most satisfactory. In the specific instance for which the device was primarily designed, viz., to preserve and heat the contents of a baby's bottle, a quart of water frozen should keep the milk in the bottle between feeding periods. The ice itself will last approximately five hours. The capacity of the device may be twenty-four 1½ inch cubes which require ten hours to melt at approximately 70° F. A quart of water is ample for heating purposes. While these approximate specifications and figures have been given for the particular instance in question, it is to be understood that the device is not limited to any particular use or dimensions. It will be noted that by the particular design of the container 1 with respect to the base 2, a dead air space (see Fig. 1) is provided between the walls of these elements and serves as a heat insulating medium.

In using the device, as the ice in the outer compartment melts, the water passes down into receptacle 12, as previously explained, and up into container 3, seeking a uniform level in both the inner and outer containers. When current is supplied to the electric heating element, the water in receptacle 12 is heated first and rises through the central opening into container 3 around the bottle. It then finds its way through the perforations in the bottle container into the outer compartment. The cool water in the outer compartment flows downward to replace that already heated and gradually the bottle and its contents are brought to the desired temperature. It will be noted that by virtue of the narrow jacket space formed about the lower part of container 3 by the walls and bottom of recess 12, a small volume of liquid is exposed to the intense heat of the heating element and the bottle contents may be heated quickly as a result. If desired a thermostatic switch could be employed to automatically shut off the current when the water reaches the proper temperature.

While I have shown herein and have illustrated in the drawings a specific embodiment of a device constructed in accordance with the invention, it is to be understood that such disclosure and illustration are for the purpose of affording a clear understanding of the principles of the invention and are not to be taken as limiting the same. Obviously, various changes in the details of construction, the materials from which the parts are made, the dimensions of the various parts, etc., may be varied without departing from the spirit of the invention.

I claim:

1. In a device of the type described, an inner container adapted to removably receive a vessel whose contents are to be preserved, an outer container formed to provide ample space around a portion of said inner container for solidified refrigerant and a relatively narrow jacket space around another portion of said inner container, and means for heating the liquid which accumulates in said jacket space as said refrigerant melts, whereby said vessel and its contents may be heated when desired.

2. In a device of the type described, an inner container adapted to removably receive a vessel whose contents are to be preserved, an outer container formed to provide ample space around a portion of said inner container for solidified refrigerant and a relatively narrow jacket space around another portion of said inner container, said inner container having openings therein to allow circulation of air and of the liquid resulting from melting of said refrigerant between said spaces and said inner container, and means for heating the liquid which accumulates in said jacket space as said refrigerant melts, whereby said vessel and its contents may be heated when desired.

3. In a device of the type described, a container adapted to removably receive a vessel whose contents are to be preserved, a jacket container having a recess in the bottom thereof for removably receiving said first container, said jacket container providing ample space about said first container for solidified refrigerant, said first container having openings to allow circulation of air and of the liquid resulting from melting of said refrigerant between said space and said first container, means for maintaining said first container centrally disposed in said recess and above the bottom thereof, and means disposed beneath said recess for heating said liquid, whereby said vessel and its contents may be heated when desired.

4. In a device of the type described, a container adapted to removably receive a vessel whose contents are to be preserved, a jacket container having a recess in the bottom thereof for removably receiving said first container, said jacket container providing ample space about said first container for solidified refrigerant, said first container having openings to allow circulation of air and of the liquid resulting from melting of said refrigerant between said space and said first container, means for maintaining said first container centrally disposed in said recess and above the bottom thereof, and an electrical heater element disposed beneath said recess for heating said liquid, whereby said vessel and its contents may be heated when desired.

5. In a device of the type described, a container adapted to removably receive a vessel whose contents are to be preserved, a jacket container having a recess in the bottom thereof for removably receiving said first container, said jacket container providing ample space about said first container for solidified refrigerant, means for maintaining said first container centrally disposed in said recess and above the bottom thereof, said first container having openings in its bottom for permitting the liquid resulting from melting of said refrigerant to pass through said recess into said first container, said first container also having openings in its side walls to allow said liquid to seek a uniform level and to allow circulation of air, and means disposed beneath said recess for heating said liquid, whereby said vessel and its contents may be heated when desired.

6. In a device of the type described, a container adapted to removably receive a vessel whose contents are to be preserved, a jacket container having a recess in the bottom thereof for removably receiving said first container, said jacket container providing ample space about said first container for solidified refrigerant, means for maintaining said first container centrally disposed in said recess and above the bottom thereof, said first container having openings in its bottom for permitting the liquid resulting from melting of said refrigerant to pass through said recess into said first container, said first container also having openings in its side walls to allow said liquid to seek a uniform level and to allow circulation of air, and an electrical heater element disposed beneath said recess for heating said liquid, whereby said vessel and its contents may be heated when desired.

RAYMOND M. THOMAS.